(12) United States Patent
Mitchell

(10) Patent No.: US 11,616,774 B2
(45) Date of Patent: Mar. 28, 2023

(54) METHODS AND SYSTEMS FOR DETECTING UNAUTHORIZED ACCESS BY SENDING A REQUEST TO ONE OR MORE PEER CONTACTS

(71) Applicant: BlackBerry Limited, Waterloo (CA)

(72) Inventor: Robert Scott Mitchell, Kitchener (CA)

(73) Assignee: BlackBerry Limited, Waterloo (CA)

( * ) Notice: Subject to any disclaimer, the term of this patent is extended or adjusted under 35 U.S.C. 154(b) by 336 days.

(21) Appl. No.: 16/250,410

(22) Filed: Jan. 17, 2019

(65) Prior Publication Data

US 2020/0236099 A1 Jul. 23, 2020

(51) Int. Cl.
| | | |
|---|---|---|
| *H04L 9/32* | (2006.01) | |
| *G06F 21/00* | (2013.01) | |
| *H04L 9/00* | (2022.01) | |
| *H04L 9/40* | (2022.01) | |
| *G06F 21/34* | (2013.01) | |
| *G06F 21/42* | (2013.01) | |

(52) U.S. Cl.
CPC ............ *H04L 63/083* (2013.01); *G06F 21/34* (2013.01); *G06F 21/42* (2013.01); *H04L 63/0853* (2013.01); *H04L 63/104* (2013.01)

(58) Field of Classification Search
CPC ........ G06F 21/34; G06F 21/316; G06F 21/42; H04L 63/1425; H04L 63/0853; H04L 63/083; H04L 63/104
USPC .............................................................. 726/5
See application file for complete search history.

(56) References Cited

U.S. PATENT DOCUMENTS

| | | | |
|---|---|---|---|
| 2002/0186688 A1* | 12/2002 | Inoue ................... | H04W 12/068 370/352 |
| 2004/0010720 A1 | 1/2004 | Singh et al. | |
| 2005/0120214 A1* | 6/2005 | Yeates ..................... | H04L 63/08 713/171 |
| 2005/0138399 A1* | 6/2005 | Cheston .................. | G06F 21/31 713/1 |

(Continued)

FOREIGN PATENT DOCUMENTS

EP 3013086 A1 4/2016

OTHER PUBLICATIONS

International Search Report and Written Opinion relating to PCT application No. PCT/CA2019/051741, dated Jan. 30, 2020.

(Continued)

*Primary Examiner* — Haresh N Patel
(74) *Attorney, Agent, or Firm* — Rowand LLP

(57) ABSTRACT

Described are methods and systems to identify unauthorized attempts to access an account in a computer system, the account having an authorized user. The methods and systems include determining that a count of failed attempts to access the account exceeds a maximum. Based on the count exceeding the maximum, one or more peer contacts associated with the authorized user are retrieved from stored user data. A failure attribution request is transmitted to the one or more peer contacts and a response is received from at least one of the one or more peer contacts. If the response denies that the authorized user caused the failed attempts, then a security action is taken with respect to the account. The method may include first confirming that the number of failure attributions requests sent has not exceeded an abuse threshold to prevent denial-of-service attacks.

22 Claims, 3 Drawing Sheets

(56) References Cited

U.S. PATENT DOCUMENTS

| | | | |
|---|---|---|---|
| 2008/0189338 A1* | 8/2008 | Weaver | G06F 11/1402 |
| 2009/0040926 A1* | 2/2009 | Li | H04L 69/162 |
| | | | 370/230.1 |
| 2009/0077645 A1* | 3/2009 | Kottahachchi | G06F 21/33 |
| | | | 726/9 |
| 2009/0116640 A1* | 5/2009 | Noh | H04N 21/47202 |
| | | | 380/29 |
| 2009/0227232 A1* | 9/2009 | Matas | H04M 1/665 |
| | | | 455/411 |
| 2009/0260081 A1 | 10/2009 | Johnson et al. | |
| 2011/0060797 A1* | 3/2011 | Balandin | G06Q 10/10 |
| | | | 709/206 |
| 2012/0266209 A1* | 10/2012 | Gooding | H04L 63/20 |
| | | | 726/1 |
| 2012/0304313 A1* | 11/2012 | Mao | H04L 67/104 |
| | | | 726/29 |
| 2013/0024515 A1* | 1/2013 | Parker | H04L 63/107 |
| | | | 709/204 |
| 2013/0169434 A1* | 7/2013 | McCown | G08B 21/00 |
| | | | 340/540 |
| 2013/0254868 A1* | 9/2013 | Khasnabish | H04L 63/02 |
| | | | 726/11 |
| 2014/0007205 A1* | 1/2014 | Oikonomou | G06F 21/41 |
| | | | 726/6 |
| 2014/0053238 A1 | 2/2014 | Brannon | |
| 2014/0259130 A1* | 9/2014 | Li | H04L 63/0281 |
| | | | 726/6 |
| 2015/0106897 A1 | 4/2015 | Davis et al. | |
| 2015/0358338 A1* | 12/2015 | Zeitlin | H04L 63/1416 |
| | | | 726/23 |
| 2016/0036902 A1* | 2/2016 | Varadarajan | H04L 67/1068 |
| | | | 709/204 |
| 2017/0064090 A1* | 3/2017 | Tamvada | H04L 67/306 |
| 2017/0085464 A1* | 3/2017 | Khakpour | H04L 45/28 |
| 2017/0208062 A1* | 7/2017 | Morikawa | H04L 9/30 |
| 2018/0091528 A1* | 3/2018 | Shahbaz | H04L 63/1475 |
| 2018/0287878 A1* | 10/2018 | Jarnikov | H04L 41/12 |
| 2018/0375956 A1* | 12/2018 | Chan | H04L 47/803 |
| 2019/0289016 A1* | 9/2019 | Malan | A63F 13/73 |
| 2020/0213334 A1* | 7/2020 | Kutner | H04L 63/1416 |

OTHER PUBLICATIONS

Extended European Search Report relating to application No. 19909657.9, dated Aug. 5, 2022.

* cited by examiner

METHODS AND SYSTEMS FOR DETECTING UNAUTHORIZED ACCESS BY SENDING A REQUEST TO ONE OR MORE PEER CONTACTS

FIELD

The present application generally relates to computer security and, in particular, to detecting unauthorized access to an account.

BACKGROUND

In computing systems, security is often maintained through requiring that a request for access be accompanied by user credentials. Those provided credentials are compared to stored authorized user credentials and, if validated, then the user access request is considered authenticated and access is granted.

A brute force attack to gain illicit access to a user account may involve a series of failed authentication attempts. To limit this attack vector, systems sometimes limit the number of failed attempts within a period of time. However, this facilitates denial-of-service attacks by locking out access to the legitimate user. Moreover, in some cases the attempts are legitimate attempts by the authorized user, but the user has mistyped the credentials or misremembered his or her password. It would be advantageous for the system to distinguish between legitimate user failures to authenticate and illegitimate attempts to authenticate that original from someone other than the authorized user. While these failed attempts are logged, they are more often invisible or ignored by the user. Some systems will prompt the user if a new login from a new host is legitimate, but if the account is compromised, those alerts can be deleted before the legitimate user can see them.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
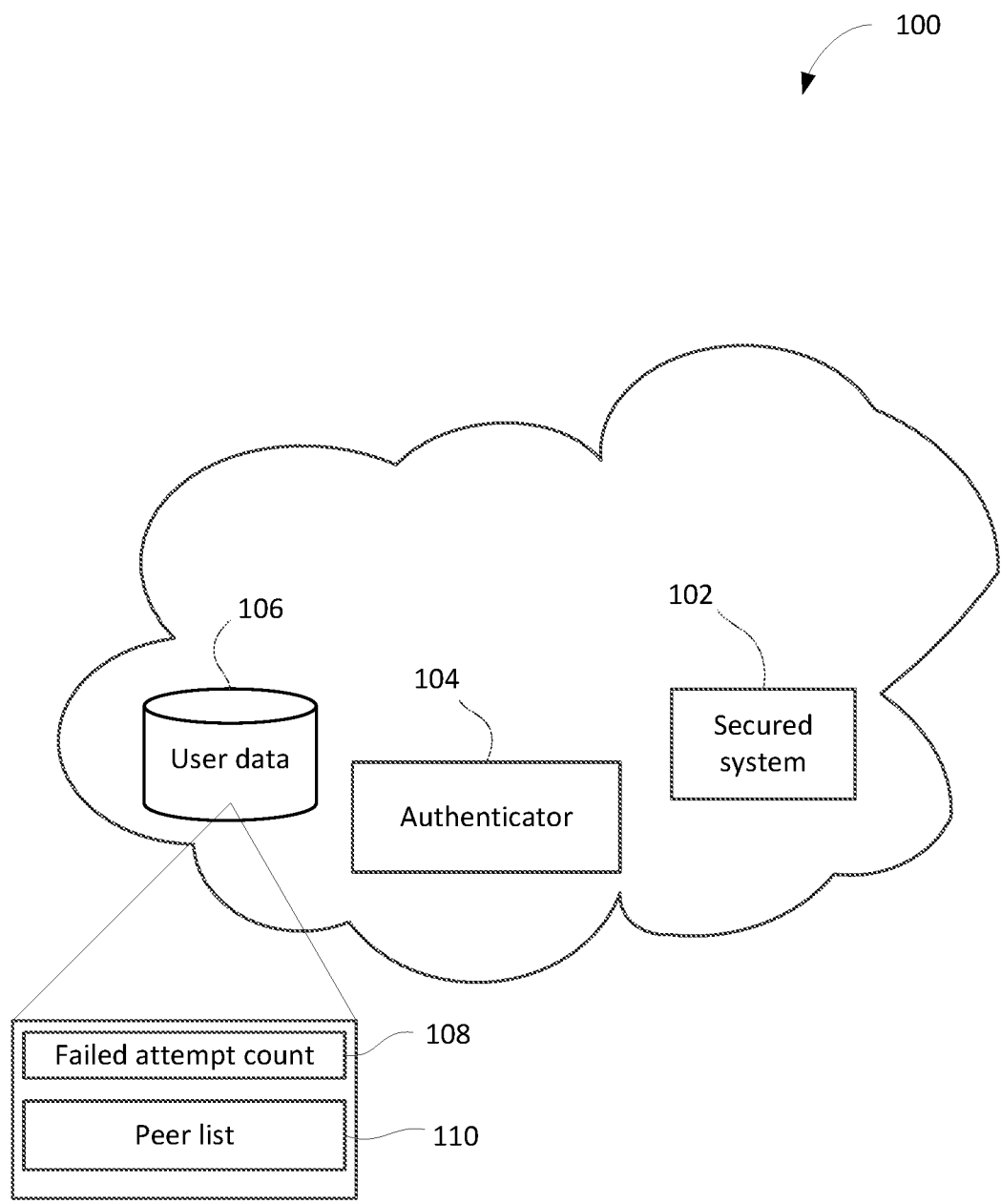
FIG. 1 diagrammatically shows an example system that includes an authenticator for managing user authentication to a secured system.

In a first aspect, the present application describes method of identifying unauthorized attempts to access an account in a computer system, the account having an authorized user. The method may include determining that a count of failed attempts to access the account exceeds a maximum; based on the count exceeding the maximum, retrieving from stored user data one or more peer contacts associated with the authorized user; transmitting a failure attribution request to the one or more peer contacts; receiving a response from at least one of the one or more peer contacts; when the response denies that the authorized user caused the failed attempts, taking a security action with respect to the account.

In another aspect, the present application describes a system for identifying unauthorized attempts to access an account in a computer system, the account having an authorized user. The system includes a processor; a memory storing user data, including one or more peer contacts associated with the authorized user; and an authentication application containing processor executable instructions that, when executed by the processor, are to cause the processor to determine that a count of failed attempts to access the account exceeds a maximum; based on the count exceeding the maximum, retrieve from the memory the one or more peer contacts associated with the authorized user; transmit a failure attribution request to the one or more peer contacts; receive a response from at least one of the one or more peer contacts; and when the response denies that the authorized user caused the failed attempts, take a security action with respect to the account.

In some implementations, the determining includes receiving comparing received credentials in a request for access to stored user credentials to find they do not match and incrementing an associated count of failed attempts.

In some implementations, the stored user data includes a peer list containing the one or more peer contacts associated with the authorized user. In some cases, the list is stored in association with the account. In some cases, each peer contact in the peer list includes peer contact information to which the failure attribution request is to be transmitted.

In some implementations, the security action may include at least one of sending a notification to a security administrator, altering an authorization setting for the account, temporarily preventing further access attempts to the account, or imposing a further level of authentication required to access the account following a successful authentication.

In some implementations, the method and system may further include transmitting an attribution request to a user contact address for the authorized user, receiving a response from the user contact address, and when the response denies user involvement in the failed attempts then taking the security action.

In some implementations, the one or more peer contacts may include a plurality of peer contacts in a hierarchical order, and transmitting may include transmitting the failure attribution request to a first peer contact in the hierarchical order; awaiting the response; and if the response is not received within a time window, sending the failure attribution request to a next peer contact in the hierarchical order. In some cases, the method and system may include temporarily preventing further access attempts to the account while awaiting the response. In some cases, the awaiting and sending are repeated for each successive peer contact in the hierarchical order until the response is received or the time window for a last peer contact expires.

In some implementations, wherein transmitting the failure attribution request includes determining that a number of failure attribution requests transmitted over a time period is below an abuse threshold as a condition precedent to transmitting the failure attribution request.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

References herein may be made to attempts to access an "account". The term "account" is to be given a broad interpretation and is not limited to a specific type of account. It is meant to refer to any resource to which access may be restricted by way of a user identity challenge. Examples may include attempts to open a locked device like a mobile phone or personal computer, attempts to access a computer environment like a user account on an enterprise network or social network, or attempts to access a service like a video streaming service. In this sense, "account" refers to any computer-secured resource that has restricted access to users that present valid authentication credentials.

In computing devices and network environments authentication is a cornerstone security technique. Authentication involves the receipt of some input to prove the identity of the user requesting access to a resource. The most typical example of user authentication data is a username and password. Other examples may include biometric input, a password alone without a username (although it may be associated with one), answers to challenge phrases, etc. An authenticator verifies the validity of the provided user authentication data by comparing it to a stored user data. The user data may include profiles for a plurality of users, each having a unique username and password. The user data may include additional data, such as authorization data indication the level of access available to the user.

A security challenge for computing systems is to prevent repeated attempts to access an account. One technique is to limit the number of consecutive failed attempts and to lock the account if too many attempts are made without success. This can be frustrating for a legitimate user that makes typing mistakes, forgets the CapsLock is on, has misremembered their password, or is trying out a number of their more commonly-used passwords to try to guess which one they used for this account. Moreover, locking the account after a maximum number of failed attempts creates a denial of service risk. That can be addressed through limiting the locking of the account to a short period of time, but that then allows for the attack to continue, albeit more slowly. Other techniques may try to distinguish between legitimate user failed attempts and malicious failed attempts using behavioral analytics, IP address information, or other side information to try to evaluate the nature of failed attempts to access.

When a user successfully logs into an account, i.e. succeeds in authentication, as a technique to improve security of the system, the system may impose two-factor authentication (2FA). 2FA simply imposes a second authentication step after the first successful authentication. This may be through presenting a further user credential request at the same user interface, or may be through providing some data, e.g. a code, via an alternative user account for the same user, and requesting that the user access that alternative user account and present the data to further authenticate the user's identity. If a user's credentials are compromised for both accounts then the malicious actor may be able to pass through the 2FA process. Strong 2FA requires that one element be something only the user knows, and something only the user possesses such as a unique rotating token or secondary device like a mobile phone to acknowledge a secondary approval prompt.

2FA adds a layer of additional security to user authentication, but does not address the issue of failed authentications and the need to evaluate whether the failed authentications represent an attack on the system or a legitimate user's attempt to access their account.

In accordance with one aspect of the present application, a computing system determines how to handle authentication failures by obtaining attribution information. In one instance, the user may be contacted via a separate communication channel, such as through a different account or a different device, to solicit information regarding a failed attempt or attempts to access an account. Through the separate communication channel, the user may confirm that the failed attempt(s) are attributable to the user or may deny that the failed attempt(s) are attributable to the user. If the response to the solicitation is denial of attribution, then the system may take certain security actions since the failed attempt(s) are a likely attack.

In accordance with another aspect of the present application, as an alternative or in addition to soliciting information from the user, attribution information may be solicited from one or more peers associated with the user. That is, the system may have stored information in association with the user linking the user to one or more peers. The one or more peers may be sent an attribution request at a device or contact point designated for the one or more peers. A response from one of the peers may indicate that the failed authentication attempt(s) are attributable to the user, which the system may treat as verification that the failed authentication attempt(s) are legitimate user failures. Such a determination may mean any alarm or lock condition may be cleared. A response from a peer that indicates that the failed authentication attempt(s) are not from the user may trigger a security action. The peer indication of non-user attribution may result in security action even if the user has indicated that the failed attempt(s) are legitimate, in some instances.

Reference is first made to FIG. 1, which diagrammatically illustrates an example system 100 for detecting likely attacks on user authentication. The system 100 includes a secured system 102. The secured system 102 represents a resource to which one or more users seeks access. The secured system 102 may include a corporate network environment with all its internal resources, in some cases. In other examples, it may be a social network, gaming network, financial network, or any other type of computing resource. The secured system 102 may be operably connected to a plurality of networks, which may include public networks, private networks, or both.

An authenticator 104 manages authentication of user requests to access the secured system 102. The authenticator 104 may include or have access to stored user data 106. An authentication request provides user authentication data to the authenticator 104, which then evaluates the validity of the user authentication data by comparing it to the stored user data 106. For example, the stored user data 106 may include identifying data for a plurality of authorized users, including usernames (or user IDs), associated passwords, and any associated security settings, like authorization levels.

In this example system 100, the user data 106 includes, for each user, a record of failed authentication attempts, which may include a count of failed authentication attempts 108. These attempts may include all unsuccessful attempts to access the account associated with a particular user. In some cases, the count may be a count of consecutive failed attempts without a successful authentication. In some cases, the count may be limited in time to attempts in the past hour, day, week, or some other time period. In yet other cases, the count may include non-consecutive failures over a time period. The records of failed authentication attempts may include additional metadata regarding the attempts, such as the IP address or other identifying information regarding the source of the attempt.

In this example, the system 100 further includes within the user data 106 a peer list 110 stored in association with an authorized user. The peer list 110 contains identifiers for one or more peers designated for the authorized user. The designation may be made by the authorized user when configuring his or her account as part of the set-up process. In some cases, such as a corporate environment, the designation of peers may be policy based and at least partly controlled by an administrator. For example, an authorized user may be required to have his or her immediate supervisor included as a peer.

The peer list 110 may include user identifiers for each of the peers, such as a username or user ID. The authenticator 104 may access the peer list 110 to obtain the user identifiers for the peers. The peer list 110 may include contact information for each peer. In some implementations, the authenticator 104 may search the user data 106 for contact details for each peer based on the user identifiers in the peer list 110. The contact details may include a mobile number, email address, messaging identity, social network identifier, SIP URI, or other peer contact data to which the authenticator 104 can send a notification or request. In some implementations, the peer list 110 may include a status of whether or not the peer is available. It will be appreciated that the peer contact is an individual different and separate from the user associated with the user account. The peer contact information includes one or more addresses or accounts associated with (owned or operated by) the peer contact. It may include device identifiers or other data specific to a device or account controlled by the peer contact that represents identifying contact information for the peer contact. To be clear, the peer contact information is not an alternative account or contact information for the user.

In an open system, the peers may not necessarily be authorized users of the secured system 102 and may not have their details stored in the user data 106 as users of the secured system 102. Nevertheless, the authorized user may have designated them as peers on configuration of the user's account and may have provided the peer contact data, which is then stored in, or in association with, the peer list 110.

Although illustrated as a single database, the user data 106 may be implemented as two or more data storage elements, including databases, and there may be multiple records, at least one of which stores user authentication information for the user, and at least another of which stores the peer list 110 associated with the user.

As noted above, the authenticator 104 may track failed authentication attempts in association with a user account. If the number of failed authentication attempts exceeds a maximum, then the authenticator 104 may output an attribution request. The trigger for the attribution request may be the count of failed authentication attempts for a user account exceeding a preset threshold, such as five or ten. The trigger may be based on consecutive failed authentication attempts without a successful authentication, in some implementations. The trigger may also take into account the time over which the failures occurred, such that the threshold is based on a maximum number of failed authentication attempts within a certain window of time, e.g. 15 minutes, an hour, a day, etc. Some implementations may consider the number of failed attempts without success from a given source IP address, or lower threshold if the source IP has not been a recent source of positive authentication. Other factors may be included in the determination of whether to send an attribution request.

Once the authenticator 104 determines that an attribution request is to be sent, then it sends a message to the user, to one or more peers, or to both. The message may be sent through any suitable medium, including instant messaging, SMS, email, or other communication types. The message informs the user and/or peers that there have been a maximum number of failed attempts to access the user account and requesting that the recipient indicate whether the attempts were made by the user. Depending on the implementation, the message may include a selectable icon, button or other response element to trigger a response message. In some cases, the message may include two different selectable response elements: one to attribute failures to the user and another to attribute failures to someone other than the user. In some cases, the message may include a link that, when selected, opens a browser session and links to a webpage through which the attribution response may be provided. Other mechanisms for soliciting and obtaining electronic feedback from the user and/or peers will be appreciated.

The message may, in some cases, contain information regarding the failed authentication attempts. That information may be obtained by the authenticator 104 from the stored record of failed authentication attempts for that user account. The information in the message may include information identifying the user account and the user, the time and or date of each attempt, the geographic location from which the access attempt appears to originate (based on IP address, for example), and/or the count of failed attempts.

Although the authenticator 104 is shown as being separate from the secured system 102 for ease of discussion, it will be appreciated that the authenticator 104 may be implemented as part of the secured system 102. It will also be appreciated that the authenticator 104 may be implemented by way of software operating on a suitable computing platform, such as a server or similar networked computing system. The software is executed by one or more processors within the computing system to cause the computing system to carry out the described operations of the authenticator 104. Any suitable programming language and/or program structure may be used in realizing the software-implemented authenticator 104.

The secured system 102 is shown as being in the "cloud" of a networked environment. In some cases, the secured system 102 may be partly or wholly local to a user device with a network connection to the cloud. The authenticator 104 may be partly implemented locally on the user device to secure the secured system 102 and partly in the cloud to perform user authentication on input user credentials and to grant access through provision of an access token or the like to the user device. Other architectures for secured systems 102 will be appreciated by those ordinarily skilled in the art.

Figure 2:
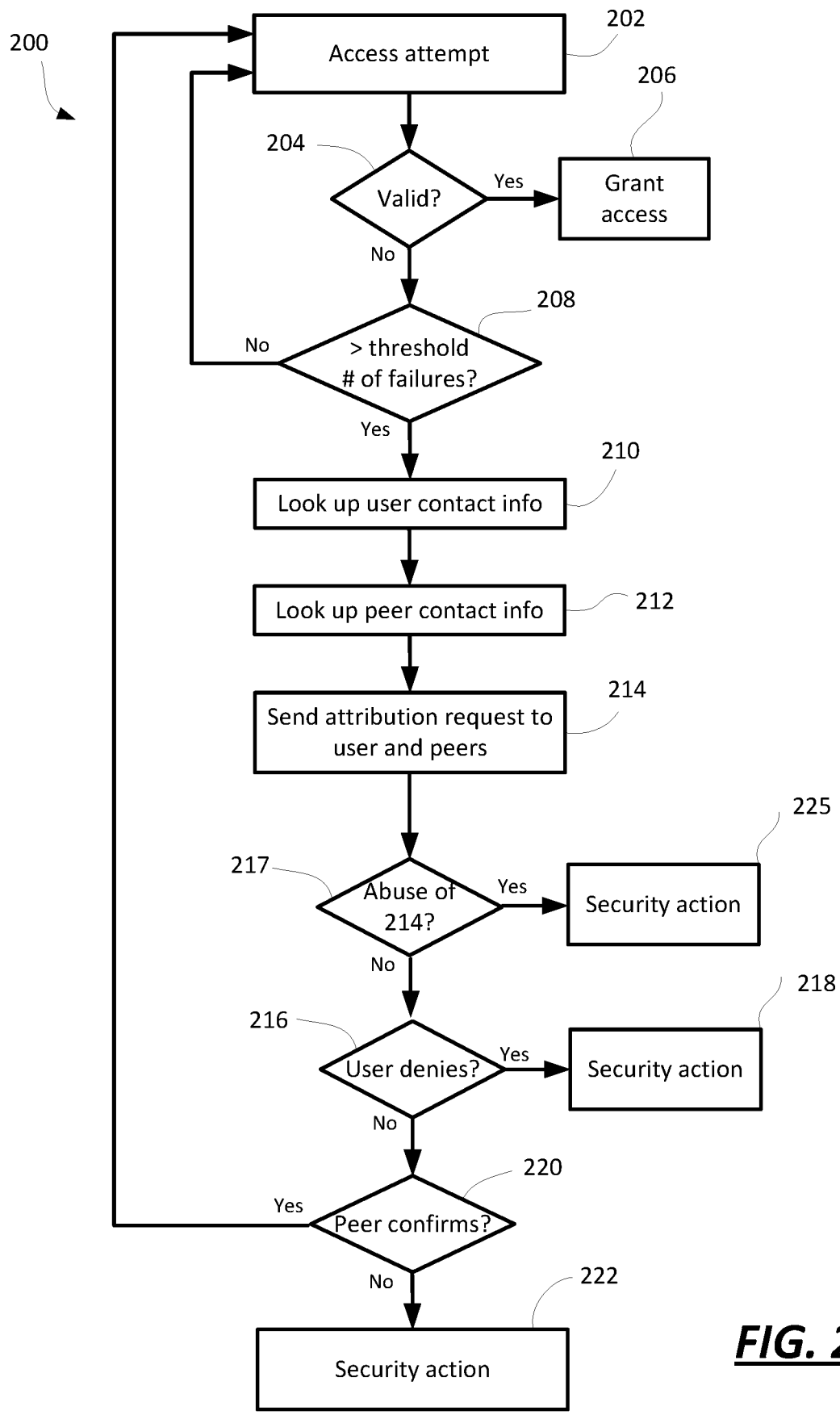
FIG. 2 shows, in flowchart form, one example method of identifying unauthorized attempts to access an account in a computer system.

Reference is now made to FIG. 2, which shows, in flowchart form, one example method 200 for identifying unauthorized attempts to access an account in a computer system. The method 200 may be implemented by the authenticator 104.

In operation 202 an access attempt is made with respect to the user account. This may involve a login attempt by way of a website, mobile app, lock screen or other software security checkpoint. In some implementations, the access attempt includes receipt of user credentials, such as a username and password or the like. The access attempt may involve the exchange of multiple messages between a remote computing device and the authenticator, in some cases. The user credentials are evaluated in operation 204 to assess whether they are valid. This may include querying a user database storing username and password combinations, for example. Suitable encryption and hashing algorithms may be used to secure the database, as will be appreciated by those ordinarily skilled in the art. If the user credentials are determined to be valid in operation 204, the requestor is granted access 206. This may include providing the remote device with a security token or data enabling it to access further portions of the secured system. It may include establishing a secured connection or session between the remote device and the secured system. Other mechanisms for enabling access to the secured system will be appreciated.

If the user credentials determined to be invalid in operation 204, then in operation 208 it is determined whether the failed authentication attempt results in more than a threshold number of failures in association with the user account. In this regard, it will be appreciated that the access attempt is associated with a given user account. For implementations in lower risk environment the threshold can be set to a larger number than that for moderate risk environments. For higher risk the threshold could be set low, or to 1 (one) to alert the peers on every failed attempt. If the access attempt involves a failure to identify an existing user account, for example due to provision of an incorrect username that does not have an associated account, then the failed attempt is not necessarily counted against any user account. It will also be understood that the threshold may take into account a number of factors, including the window of time over which the failed attempts have occurred, whether any intervening successful attempts have been made, and other factors, as discussed above.

If, in operation 208, it is determined that the count of failed authentication attempts does not exceed the threshold, then the method 200 returns to operation 202. If the count does exceed the threshold, then attribution information may be sought to identify the source of the unauthenticated attempts. In operation 210, user contact information associated with the user account is retrieved. This may include an email, mobile number, messaging ID, or other user contact data stored in association with the user account. In operation 212, peer contact information for one or more peers associated with the user account is retrieved. This may include obtaining peer contact information from a stored list of peers associated with the user account. The peer contact information may include an email, mobile number, messaging ID, or other peer contact information to which the system can send a message or notification.

In operation 214 a notification is sent to the user and to the peers. The notification may be sent via any suitable communication medium for a given implementation, such as SMS, email, social network messaging, instant messaging, or other such mediums. The notification is addressed based on the contact information obtained in operations 210 and 212. The notification to the user may differ from the notification to the peers. The notification may be a message containing a selectable element to trigger a response message. The message may contain a link to a website or other interface through which the recipient can provide a response. The response sought is whether the failed attempts can be attributed to the user. In of itself, operation 214 could be exploited by an attacker making multiple failed authentication attempts across a wide range of authorized users, triggering a flood of peer validation requests. As such, some implementations would establish a counter measure, operation 217, to make a count of peer validation requests in a given time frame, and throttle the requests, and trigger an appropriate security action in operation 225. If the count is below the acceptable threshold, which may be labelled an "abuse threshold", the process would continue to operation 216. It will be appreciated that operation 217 may occur before operation 214 as a condition precedent to transmitting the notification.

In this example, the system first awaits a response from the user, as indicated by operation 216. If the response received from the user is a denial that the attempts are by the user, then the system may take a security action in operation 218. If the response is that the attempts are legitimate attempts by the user, then the system proceeds to evaluate at least one peer response. In some implementations that can determine that no immediate peers are available to respond, and depending on the security risk level and the administrative policy applied, the system can trigger an appropriate security action. In one embodiment of the disclosure, the security action performed in operation 225 is different from the security operation performed in operation 218. More precisely, in one embodiment of the disclosure, the security action performed in operation 218 is stricter than the security action performed in operation 225, from a security point of view. In a variant, the security action performed in operation 225 and the security action performed in operation 218 are the same.

In operation 220, the system evaluates a peer response. If the peer confirms that the failed attempts are attributable to the user, then the system returns to 202 and no security action is taken. In some cases, the system may clear a restricted security setting with respect to the user account. In one example, the system may zero the number of failed attempts stored in the count so as to enable the user to retry accessing the account without immediately re-triggering the attribution process.

If the peer response denies user attribution in operation 220, then the system make take a security action in operation 222.

The security action may include sending a notification to an administrator or other security point. It may include changing authorization data for the user account to provide more restricted access in the event a successful authentication occurs. In some cases, it may include locking the account to prevent successful authentication, perhaps for a preset period of time. In some instances, it may result in additional security oversight, such as triggering a recording or more robust log of all activity associated with the user account and any attempts to access the user account. In some cases, the security action may include imposing a further level of authentication that is required even if someone is able to successfully authenticate.

Figure 3:
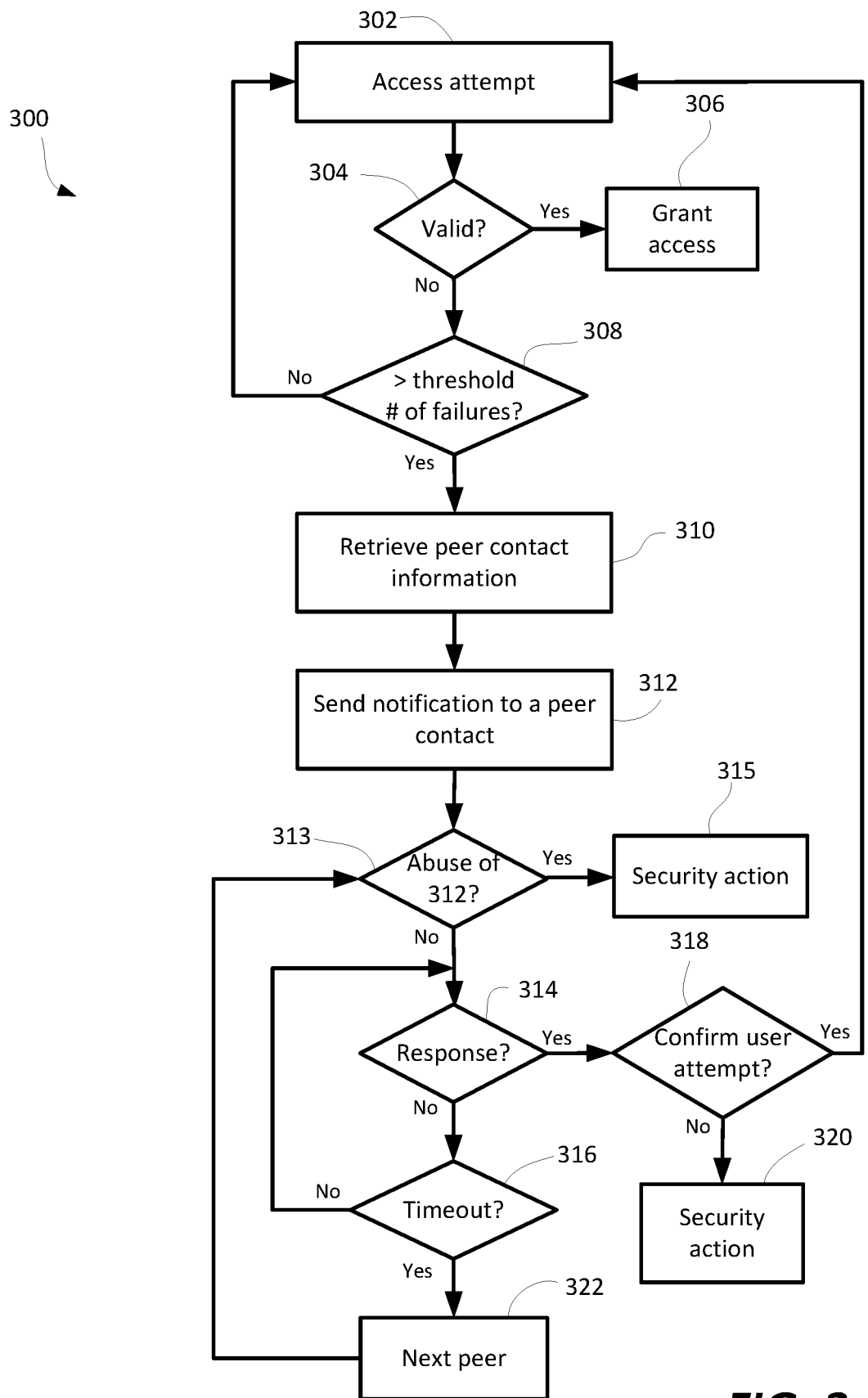
FIG. 3 shows, in flowchart form, another example method of identifying unauthorized attempts to access an account in a computer system.

In some cases, the notification to the peers may be staged based on a hierarchical ranking of the peers. In one example implementation, the attribution process does not include contacting the user for attribution information and only involves contacting the one or more peers associated with the user account. FIG. 3 shows another example method 300 of identifying unauthorized attempts to access an account in a computer system. In this example, the authenticator monitors access attempts and determines when the number of failed consecutive access attempts exceeds a threshold, as indicated by operations 302, 304, 306 and 308.

Once the number of consecutive failed authentication attempts exceeds the threshold, peer contact information is retrieved from storage in operation 310. The peer contact information may include a peer list, which may rank the peer contacts in an order. In some cases, administrative policies may determine the order. For example, an immediate supervisor may be ranked first. An IT department representative may be included in the ranking. A co-worker may have a lower ranking than IT department personnel or supervisory personnel.

In operation 312, a notification regarding the failed authentication attempts is sent to the first or highest ranked peer contact associated with the user account. The notification requests attribution for the failed authentication attempts. In particular, it may request confirmation that the failed authentication attempts were failed attempts by the user. The system then awaits a response, as indicated by operations 314, and 316. The time for response may be set to any suitable time for a particular implementation. For example, some number of minutes (1, 2, 5, etc.) may be set as the response time. If the request for a response does not result in receipt of an attribution response from the peer contact, then the system may return to operation 312 to send a notification to the next peer contact in hierarchical order, as shown by operation 322. In of itself, operation 312 could be exploited by an attacker making multiple failed authentication attempts across a wide range of authorized users, triggering a flood of peer validation requests. As such, some implementations would establish a counter measure, operation 313, to make a count of peer validation requests in a given time frame, and throttle the requests, and trigger an appropriate security action in operation 315. If the count is below the abuse threshold, the process would continue to operation 314. It will be appreciated that operation 313 may occur prior to, and as a condition precedent to, sending the attribution request in operation 312.

If a response is received in operation 318, then the response either confirms that the user is the source of the failed attempts, in which case the method 300 returns to operation 302 to accept new attempts to access the account, or the response denies user involvement, in which case a security action is taken with regard to the account, as shown by operation 320. As noted above, the security action may include one or more operations to notify, lock, restrict, or otherwise take measures with regard to the account. In one embodiment of the disclosure, the security action performed in operation 315 is different from the security action performed in operation 320. More precisely, in one embodiment of the disclosure, the security action performed in operation 320 is stricter than the security action performed in operation 315. In a variant, the security action performed in operation 315 and the security action performed in operation 320 are identical.

In some cases, while awaiting a response from the peer contacts, a security action may be implemented to prevent further attempts to access the user account. That is, the account may be temporarily locked while awaiting attribution information from the peer contacts. This may assist in slowing down an attack if the failed authentication attempts are part of an attack. A confirmation of user involvement in operation 318 may result in removal of the restrictions on the account. Conversely, a peer contact response that denies user involvement may result in leaving the account restrictions in place as the security action of operation 322. Further actions may also be taken, such as sending a notification to IT administrators regarding the locked account.

If the peer contact list is exhausted without receiving a response from any of the peer contacts within the time out period, and/or if no peers are determined to be active and/or available, then the system may be configured to notify one or more IT administrators, lift security restrictions, seek user confirmation at an alternative user contact address, or take one or more other actions. In some examples, the account may remain locked until at least one of the peer contacts replies to the notification or security administrator clears the event upon adequate alternate authentication.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of identifying unauthorized attempts to access an account in a computer system, the account having an authorized user, the method comprising:
   determining that a count of failed attempts to access the account exceeds a maximum;
   based on the count exceeding the maximum, retrieving from stored user data one or more peer contacts associated with the authorized user;
   transmitting a failure attribution request to the one or more peer contacts, the failure attribution request for requesting attribution for the failed attempts to access the account;
   receiving a response to the failure attribution request from at least one of the one or more peer contacts, the response either indicating that the failed attempts to access the account are attributable to the authorized user or denying that the failed attempts to access the account are attributable to the authorized user;
   when the response denies that the authorized user caused the failed attempts to access the account, taking a security action with respect to the account; and
   when the response confirms that the authorized user caused the failed attempts to access the account, clearing the count of failed attempts to access the account.

2. The method of claim 1, wherein determining comprises:
   receiving a request for access to the account with offered credentials;

determining that the offered credentials do not match stored user credentials for the account; and incrementing the count of failed attempts.

3. The method of claim 1, wherein the stored user data comprises a peer list containing the one or more peer contacts associated with the authorized user.

4. The method of claim 3, wherein the peer list is stored in association with the account.

5. The method of claim 3, wherein each peer contact in the peer list comprises peer contact information to which the failure attribution request is to be transmitted.

6. The method of claim 1, wherein the security action comprises at least one of sending a notification to a security administrator, altering an authorization setting for the account, temporarily preventing further access attempts to the account, or imposing a further level of authentication required to access the account following a successful authentication.

7. The method of claim 1, wherein the method further comprises transmitting an attribution request to a user contact address for the authorized user, receiving a response from the user contact address, and when the response denies user involvement in the failed attempts then taking the security action.

8. The method of claim 1, wherein the one or more peer contacts comprise a plurality of peer contacts in a hierarchical order, and wherein transmitting comprises:

transmitting the failure attribution request to a first peer contact in the hierarchical order;

awaiting the response; and if the response is not received within a time window, sending the failure attribution request to a next peer contact in the hierarchical order.

9. The method of claim 8, wherein the method further comprises temporarily preventing further access attempts to the account while awaiting the response.

10. The method of claim 8, wherein the awaiting and sending are repeated for each successive peer contact in the hierarchical order until the response is received or the time window for a last peer contact expires.

11. The method of claim 1, wherein transmitting the failure attribution request comprises determining that a number of failure attribution requests transmitted over a time period is below an abuse threshold as a condition precedent to transmitting the failure attribution request.

12. A system for identifying unauthorized attempts to access an account in a computer system, the account having an authorized user, the system comprising:

a processor;

a memory storing user data, comprising one or more peer contacts associated with the authorized user; and an authentication application containing processor executable instructions that, when executed by the processor, are to cause the processor to:

determine that a count of failed attempts to access the account exceeds a maximum;

based on the count exceeding the maximum, retrieve from the memory the one or more peer contacts associated with the authorized user;

transmit a failure attribution request to the one or more peer contacts, the failure attribution request for requesting attribution for the failed attempts to access the account;

receive a response to the failure attribution request from at least one of the one or more peer contacts, the response either indicating that the failed attempts to access the account are attributable to the authorized user or denying that the failed attempts to access the account are attributable to the authorized user;

when the response denies that the authorized user caused the failed attempts to access the account, take a security action with respect to the account; and when the response confirms that the authorized user caused the failed attempts to access the account, clear the count of failed attempts to access the account.

13. The system of claim 12, wherein the instructions are to cause the processor to determine that the count of failed attempts to access the account exceeds the maximum by:

receiving a request for access to the account with offered credentials;

determining that the offered credentials do not match stored user credentials for the account; and incrementing the count of failed attempts.

14. The system of claim 12, wherein the stored user data comprises a peer list containing the one or more peer contacts associated with the authorized user.

15. The system of claim 14, wherein the peer list is stored in association with the account.

16. The system of claim 14, wherein each peer contact in the peer list comprises peer contact information to which the failure attribution request is to be transmitted.

17. The system of claim 12, wherein the security action comprises at least one of sending a notification to a security administrator, altering an authorization setting for the account, temporarily preventing further access attempts to the account, or imposing a further level of authentication required to access the account following a successful authentication.

18. The system of claim 12, wherein the instructions are to further cause the processor to transmit an attribution request to a user contact address for the authorized user, receive a response from the user contact address, and when the response denies user involvement in the failed attempts then take the security action.

19. The system of claim 12, wherein the one or more peer contacts comprise a plurality of peer contacts in a hierarchical order, and wherein the instructions are to cause the processor to transmit by:

transmitting the failure attribution request to a first peer contact in the hierarchical order;

awaiting the response; and if the response is not received within a time window, sending the failure attribution request to a next peer contact in the hierarchical order.

20. The system of claim 19, wherein the instructions are to further cause the processor to temporarily prevent further access attempts to the account while awaiting the response.

21. The system of claim 19, wherein the awaiting, and sending are repeated for each successive peer contact in the hierarchical order until the response is received or the time window for a last peer contact expires.

22. A non-transitory computer-readable storage medium storing instructions that, when executed by a processor of a computer system, cause the processor to identify unauthorized attempts to access an account, the account having an authorized user, the instructions, when executed by the processor, cause the processor to:

determine that a count of failed attempts to access the account exceeds a maximum;

based on the count exceeding the maximum, retrieve from stored user data one or more peer contacts associated with the authorized user;

transmit a failure attribution request to the one or more peer contacts, the failure attribution request for requesting attribution for the failed attempts to access the account;
receive a response to the failure attribution request from at least one of the one or more peer contacts, the response either indicating that the failed attempts to access the account are attributable to the authorized user or denying that the failed attempts to access the account are attributable to the authorized user; and
when the response denies that the authorized user caused the failed attempts to access the account, take a security action with respect to the account; and
when the response confirms that the authorized user caused the failed attempts to access the account, clear the count of failed attempts to access the account.

\* \* \* \* \*